No. 868,499. PATENTED OCT. 15, 1907.
H. SPENCE.
SPINDLE.
APPLICATION FILED DEC. 7, 1906.
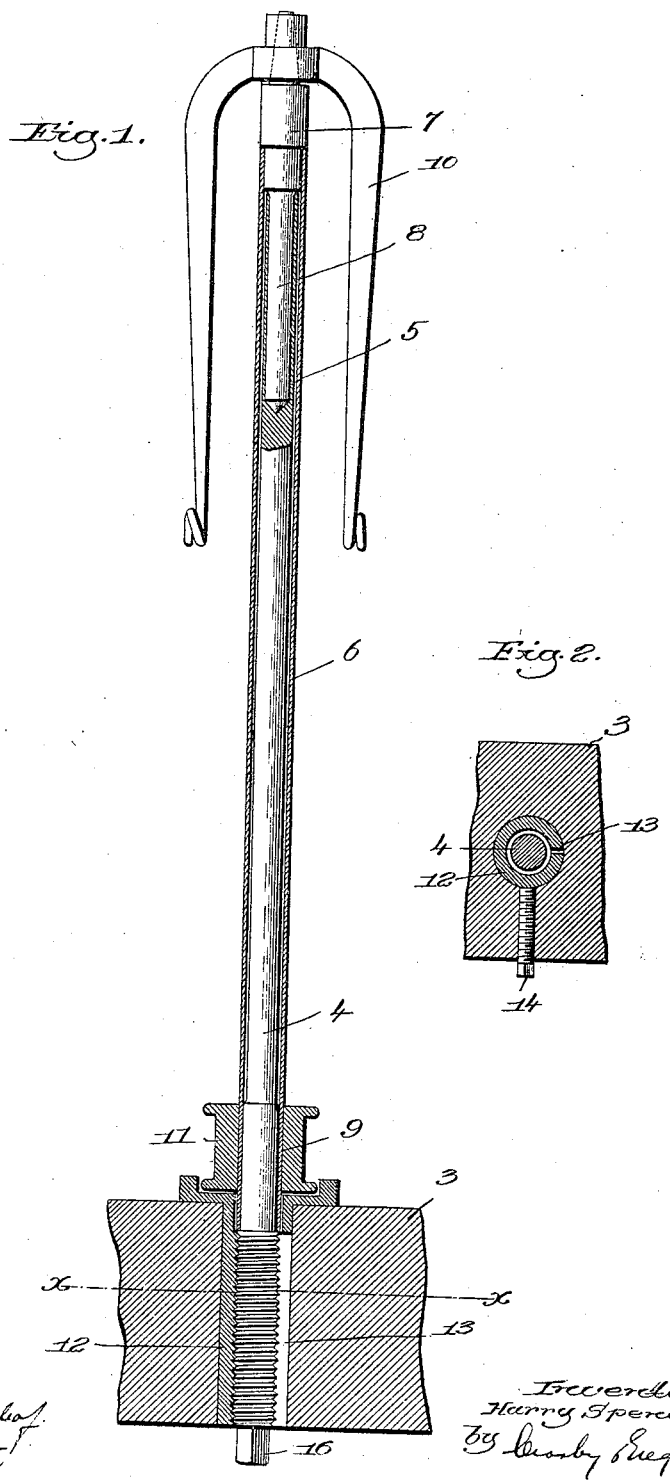

UNITED STATES PATENT OFFICE.

HARRY SPENCE, OF LAWRENCE, MASSACHUSETTS, ASSIGNOR OF ONE-THIRD TO JAMES SPEED, OF LAWRENCE, MASSACHUSETTS, AND ONE-THIRD TO HARRY STEPHENSON, OF BOSTON, MASSACHUSETTS.

SPINDLE.

No. 868,499.  Specification of Letters Patent.  Patented Oct. 15, 1907.

Application filed December 7, 1906. Serial No. 346,761.

*To all whom it may concern:*

Be it known that I, HARRY SPENCE, a citizen of the United States, residing in Lawrence, county of Essex, and State of Massachusetts, have invented an Improvement in Spindles, of which the following description, in connection with the accompanying drawing, is a specification, like letters on the drawing representing like parts.

This invention relates to spindles and has for one object to provide a novel spindle and support therefor which is of such a construction that the spindle may be rotated at a very high rate of speed without any appreciable vibration; and for another object to provide a novel construction by which the spindle may be readily adjusted in the bolster.

In accordance with my invention I secure to the bolster or to any other suitable part a spindle support having at its upper end a step bearing, and I employ a tubular spindle which surrounds and rotates about the spindle support, the spindle having a step bearing at the upper end of the spindle support and a centering bearing at the lower end thereof. The tubular spindle because of its tubular structure is not only light but very strong, and by putting the step bearing, or that bearing which supports the weight of the spindle at the upper end thereof the spindle may be rotated at a very high rate of speed without causing any appreciable vibration or jarring.

I will first describe one embodiment of my invention and then point out the novel features in the appended claims.

In the drawings, Figure 1 is a vertical section through a spindle embodying my invention; Fig. 2 is a section on the line *x—x*, Fig. 1.

3 designates the bolster or any other suitable support for the spindle, and 4 designates the spindle support. This spindle support is shown in the form of a cylindrical rod and is stationarily mounted in the bolster. The upper end of the spindle support is provided with a step bearing 5 by which the weight of the spindle is taken, said step bearing also serving to center the upper end of the spindle.

The spindle is designated by 6, and it is in the form of a sleeve or tubular member which surrounds the spindle support 4. The spindle has at its upper end a head 7 provided with a bearing 8 which enters the socket or recess in the upper end of the spindle-support, the lower end of the bearing 8 resting on the bottom of the recess in the spindle support and forming a step bearing to support the spindle. The interior diameter of the tubular spindle 6 is slightly greater than the diameter of the spindle-support, so that the spindle is out of contact with the spindle-support for the greater part of the length thereof. At the lower end however the spindle engages the spindle-support, as shown at 9, to form a centering bearing for the lower end of the spindle.

10 designates a flier of any suitable or usual construction supported by the head, and 11 is a whirl or pulley rigidly mounted on the spindle. This whirl is herein shown as situated at the lower end of the spindle and directly opposite the centering bearing 9.

The spindle-support is mounted in the bolster 3 for vertical adjustment, and for this purpose I have shown it as screw-threaded into a bushing or sleeve 12 which bushing or sleeve is threaded into the bolster. This bushing is split, as at 13, and the spindle-support is firmly clamped in the bushing by causing the split part of the bushing to grip the screw-threaded part of the spindle-support by means of a set screw 14. The lower end of the spindle-support is shown as being squared at 16, so that a wrench or other implement may be applied thereto for screwing it up or down in the bushing for adjustment.

It will be noted that the spindle has contact with the spindle-support only at the top and bottom, and, therefore, the friction is reduced to a minimum. Furthermore, it will be noted that the spindle is tubular, and, therefore, can be made very light without reducing its strength.

Another feature of my invention is that the step bearing 5, which carries the weight of the parts, is situated adjacent the head 7 and the flier 10, and is, therefore, at that portion of the spindle where the greatest weight is situated. The result is that the spindle will run very steadily even at a very high rate.

Having described my invention what I claim as new and desire to secure by Letters Patent is:—

1. The combination with a stationary spindle support of a tubular spindle surrounding said support and having a step bearing thereon at its upper end, and a flier carried by the upper end of the spindle.

2. A stationary spindle-support, a tubular spindle surrounding the same and guided thereby, a flier at the upper end of the spindle, and a whirl at the lower end thereof.

3. A stationary spindle-support, a tubular spindle surrounding the same and having a step bearing on the spindle-support at the upper end thereof, and a centering bearing on said spindle-support at the lower end thereof.

4. A stationary spindle-support, a tubular spindle fitted thereon, a flier at the upper end of the spindle, and a whirl at the lower end thereof, said spindle having a step bearing on the spindle-support at its upper end, and a centering bearing thereon at its lower end.

5. A bolster, a split bushing therein, a spindle-support screw-threaded into the bushing, and a tubular spindle surrounding the spindle-support and rotatable thereabout.

6. A bolster, a split bushing therein, a spindle-support screw-threaded into the bushing, and a tubular spindle surrounding the spindle-support and rotatable thereabout, said spindle having a step bearing on the spindle-support at its upper end and a centering bearing thereon at its lower end.

In testimony whereof, I have signed my name to this specification, in the presence of two subscribing witnesses.

HARRY SPENCE.

Witnesses:
 HARRY R. LAWRENCE,
 ORRIN ANDREWS.